US006648370B2

(12) United States Patent
Koga et al.

(10) Patent No.: US 6,648,370 B2
(45) Date of Patent: Nov. 18, 2003

(54) GAS GENERATING APPARATUS

(75) Inventors: Koji Koga, Tokyo (JP); Tsuneo Chikaraishi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/860,762

(22) Filed: May 21, 2001

(65) Prior Publication Data

US 2002/0001785 A1 Jan. 3, 2002

Related U.S. Application Data

(60) Provisional application No. 60/205,307, filed on May 19, 2000.

(51) Int. Cl.[7] .............................................. B60R 21/26
(52) U.S. Cl. ........................ 280/736; 280/741; 102/531
(58) Field of Search ................. 280/736, 740, 280/741, 742; 102/530, 531

(56) References Cited

U.S. PATENT DOCUMENTS

| 4,561,675 A | * | 12/1985 | Adams et al. | 280/741 |
|---|---|---|---|---|
| 5,005,486 A | * | 4/1991 | Lenzen | 280/741 |
| 5,944,343 A | | 8/1999 | Vitek et al. | 280/736 |
| 5,970,880 A | * | 10/1999 | Perotto | 280/741 |
| 6,032,979 A | | 3/2000 | Mossi et al. | 280/741 |
| 6,050,599 A | * | 4/2000 | Marsaud et al. | 280/736 |
| 6,068,291 A | * | 5/2000 | Lebaudy et al. | 280/736 |
| 6,079,739 A | * | 6/2000 | Perotto et al. | 280/736 |
| 6,189,924 B1 | | 2/2001 | Hock | 280/736 |
| 6,189,927 B1 | | 2/2001 | Mossi et al. | 280/741 |
| 6,422,601 B1 | * | 7/2002 | Quioc | 280/736 |
| 6,447,007 B1 | * | 9/2002 | DiGiacomo et al. | 280/741 |

FOREIGN PATENT DOCUMENTS

| DE | 29819168 | | 3/1999 |
|---|---|---|---|
| DE | 299 20 123 | * | 2/2000 |
| EP | 0 787 630 | * | 8/1997 |
| WO | WO99/08907 | | 2/1999 |
| WO | 99/33685 | * | 7/1999 |
| WO | 01/72561 | * | 10/2001 |

* cited by examiner

Primary Examiner—Peter C. English
(74) Attorney, Agent, or Firm—Foley & Lardner

(57) ABSTRACT

A gas generating apparatus is provided which includes a plurality of combustion chambers and a filter chamber. The filter chamber contains a filter which includes a region which is not substantially heated by combustion gases generated by one combustion chamber and which receives combustion gases subsequently generated in another combustion chamber. In this fashion, a high gas cooling efficiency is achieved. The gas generating apparatus has an upwardly-opening vessel-shaped base and a downwardly-opening vessel-shaped cup which when combined form an outer shell of combustion chambers. A filter cap is fixed to the upper side of the cup, thereby defining the filter chamber. A first combustion chamber is positioned outside a pipe through the base and a second combustion chamber is formed inside the pipe. A foil on the inner surface of the filter chamber prevents combustion gases emitted by one combustion chamber entering another combustion chamber.

20 Claims, 6 Drawing Sheets

GAS GENERATING APPARATUS

CROSS REFERENCE TO RELATED APPLICATIONS

The present application claims priority to and the benefit of U.S. Provisional Patent Application Ser. No. 60/205,307 filed May 19, 2000. The foregoing provisional application is incorporated by reference herein in its entirety.

BACKGROUND OF THE INVENTION

The present invention relates to a gas generating apparatus which generates gases for inflating and expanding an airbag. More particularly, the present invention is concerned with a gas generating apparatus of the type in which a filter chamber and a combustion chamber are separated from each other.

Conventional gas generating apparatuses are broadly sorted into two types: a single-chamber type in which a propellant and a filter are accommodated in a common chamber as disclosed, for example, in WO 99/08907 (which is incorporated herein by reference in its entirety), and a separate-chamber type in which a propellant and a filter are disposed in separate chambers as disclosed in, for example, DE 298 19 168 (which is incorporated herein by reference in its entirety). In the gas generating apparatus of the separate-chamber type, a combustion chamber accommodating a propellant and a filter chamber accommodating a filter are separated from each other by a bulkhead or a partition in which a communication hole is formed. This communication hole maintains communication between the combustion chamber and the filter chamber until the maximum combustion pressure is reached after the start of the combustion. Thus, the escape of the combustion gas into the filter chamber starts right after the start of the combustion; the inflow of gas causes a little delay to rise the combustion pressure to the maximum. This delay slows the speed of the combustion.

U.S. Pat. No. 6,032,979 (which is incorporated herein by reference in its entirety) discloses a gas generating apparatus (referred to also as an "inflator", hereinafter) having first and second chambers, wherein an outlet orifice of the second chamber is in fluid communication with the content of the first chamber.

These are representative examples of the shortcomings in the prior art. Accordingly, there is a need to improve the initial restraining capability to be provided by an airbag by shortening the starting timing of rising the inner pressure by shortening the period required from the start of rising the inner pressure until the inner pressure reaches the maximum value.

There also is a demand for an inflator which affords a greater degree of design freedom in regard to the positions of gas-discharging ports.

An inflator is also demanded which affords a greater degree of design freedom in regard to the shape so as to be adaptable to a variety of installation positions.

It is also desirable that an inflator has a high efficiency of cooling the combustion gas.

SUMMARY OF THE INVENTION

According to the present invention a gas generating apparatus is provided. The apparatus includes a first combustion chamber having a first opening and a second combustion chamber having a second opening. Each of the combustion chambers contains an ignitor and a propellant. The apparatus includes a filter chamber accommodating a filter, wherein said filter chamber is separated from each said combustion chambers. The apparatus is configured so that a combustion gas produced in the first combustion chamber exits the first combustion chamber through the first opening and enters a first portion of the filter chamber without passing through the second chamber. The apparatus includes a reverse-flow prevention member provided in the second opening thereby preventing the combustion gas generated in the first combustion chamber from flowing into the second combustion chamber.

The apparatus is configured so that a combustion gas produced in the second combustion chamber exits the second combustion chamber through the second opening and enters a second portion of the filter chamber without passing through the first combustion chamber. The second combustion chamber may include a third opening positioned to allow the combustion gas produced in the second combustion chamber to exit the second combustion chamber and enter the filter chamber without passing through the first combustion chamber. Furthermore, the first and second openings may be spaced apart so that the combustion gases exiting from the first and second combustion chambers substantially permeate different regions of the filter.

The apparatus may further include a separating member positioned to separate the first and second combustion chambers from the filter chamber. The separating member may contain the first and second openings. The apparatus may include a first closure device blocking the first opening and being configured to open when the pressure in the first combustion chamber reaches a first predetermined value; and a second closure device blocking the second opening being configured to open when the pressure in the second combustion chamber reaches a second predetermined value.

In an alternative embodiment of the present invention, a gas generating apparatus comprising a first combustion chamber including a first opening and a second combustion chamber including a second opening is provided. The apparatus may further include a filter chamber accommodating a filter, wherein said filter chamber is separated from each said combustion chambers. The apparatus may be configured so that a first combustion gas produced in the first combustion chamber exits the first combustion chamber through the first opening and enters a first portion of the filter chamber without passing through the second chamber and a second combustion gas produced in the second combustion chamber exits the second combustion chamber through the second opening and enters a second portion of the filter chamber without passing through the first combustion chamber. The first and second portions of the filter chamber are located apart so that the combustion gases exiting from the first and second combustion chambers substantially permeate different regions of the filter.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below and which constitute part of this specification.

DETAILED DESCRIPTION

Figure 1:
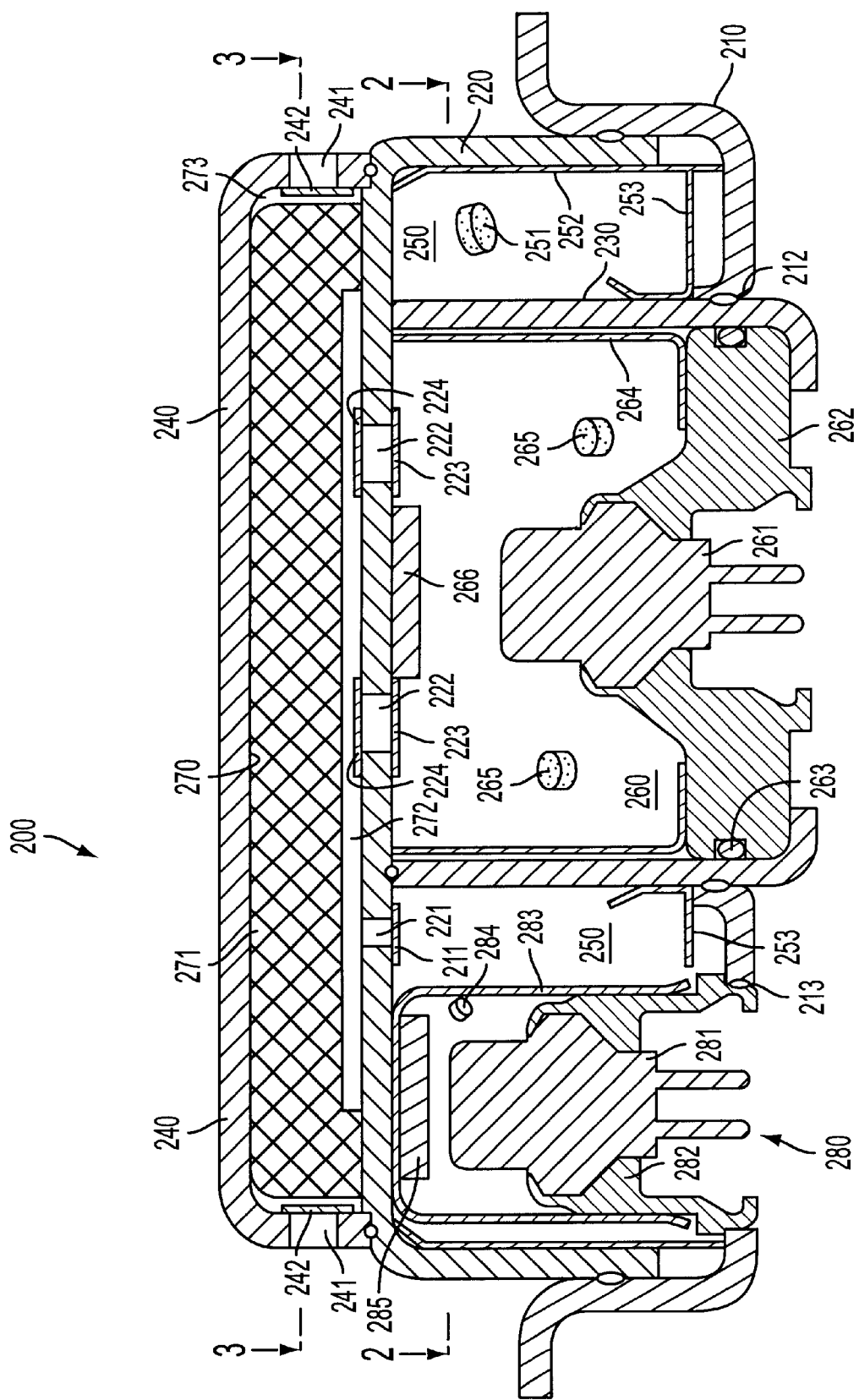
FIG. 1 is a longitudinal sectional view of a gas generating apparatus in accordance with the present invention.

Preferred embodiments of the present invention will be described with reference to the accompanying drawings. It is to be understood that the sizes, shapes and arrangements of the components or parts are shown schematically only by way of example. It is also to be noted that various numerical conditions appearing in the following description are only illustrative.

In accordance with the present invention, there is provided a gas generating apparatus which includes at least two combustion chambers each having an orifice or opening formed thereon. An ignitor and a propellant are provided in each of the at least two combustion chambers. The gas generating apparatus also includes a filter chamber, which accommodates a filter, separated from the at least two combustion chambers. Each of the combustion chambers' orifices are in fluid communication with the filter chamber. Accordingly, gas leaving one combustion chamber need not pass through another combustion chamber prior to entering the filter chamber. To prevent combustion gases (which are created when the ignitor is ignited thereby lighting the propellant in the combustion chamber) generated in a first one of the combustion chambers from flowing into a second combustion chamber in which combustion has not yet taken place, a reverse-flow prevention member is provided in the orifice of the second combustion chamber.

With these features, combustion gases from different combustion chambers permeate through different regions of the filter which have not yet been heated by combustion gases and, hence, are kept at comparatively low temperature. Accordingly, the cooling capacity inherently possessed by the filter can fully be utilized, thereby achieving a higher cooling effect.

Preferably, the orifices provided in the combustion chambers are disposed so that the regions where the orifices face the filter are not locally concentrated. Such an arrangement further ensures that combustion gases from different combustion chambers permeate through different regions of the filter which have not yet been heated by combustion gases and, hence, are kept at comparatively low temperature. In this fashion, the cooling capacity inherently possessed by the filter can fully be utilized, thereby achieving a higher cooling effect.

The gas generating apparatus may also include communication holes, orifices or openings formed in a separating member separating the combustion chambers from the filter chamber; the communication holes provide communication between the combustion chambers and the filter chamber. In addition, the gas generating apparatus may also include closure means which hermetically block each of the communication holes until the pressure in a combustion chamber reaches a predetermined pressure; the communications holes associated with that combustion chamber would then be opened thereby allowing fluid communication between the combustion chamber and the filter chamber.

With these features, the pressure inside the combustion chamber rises quickly because the combustion chamber's hermetic closure means is broken to open a passage when the inner pressure of the combustion chamber reaches a predetermined pressure. The breaking of the closure means at this pressure shortens the starting timing of rising the inner pressure and shortens the period required from the start of rising the inner pressure until the inner pressure reaches the maximum value. In this manner, the initial restraining capability of the airbag apparatus is enhanced.

The closure means may comprise a breakable member which breaks at a predetermined pressure.

According to this structure, an inexpensive material such as aluminum foil can be employed as the closure member.

Figure 2:
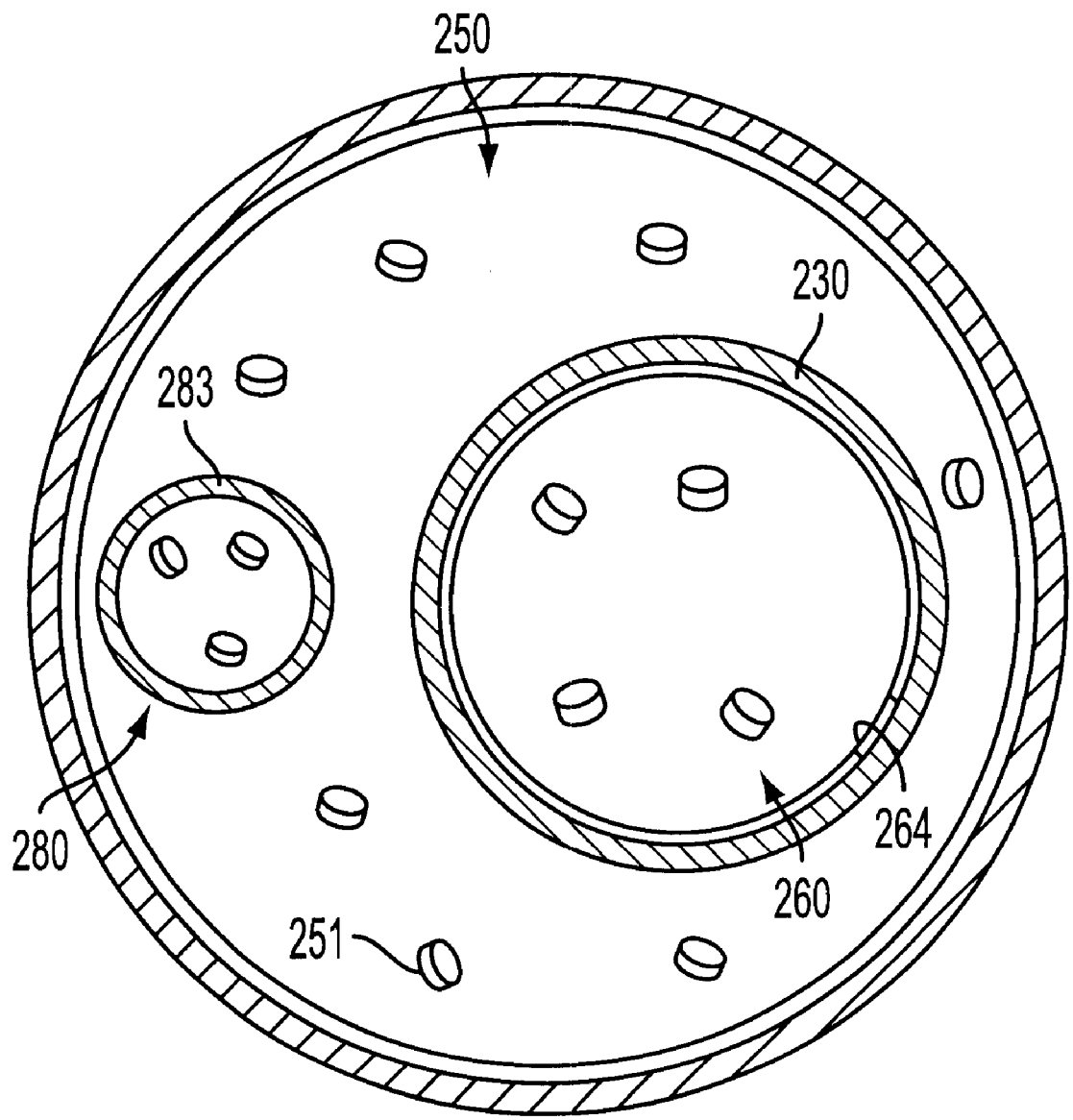
FIG. 2 is a sectional view taken along the line 2—2 of FIG. 1.
Figure 3:
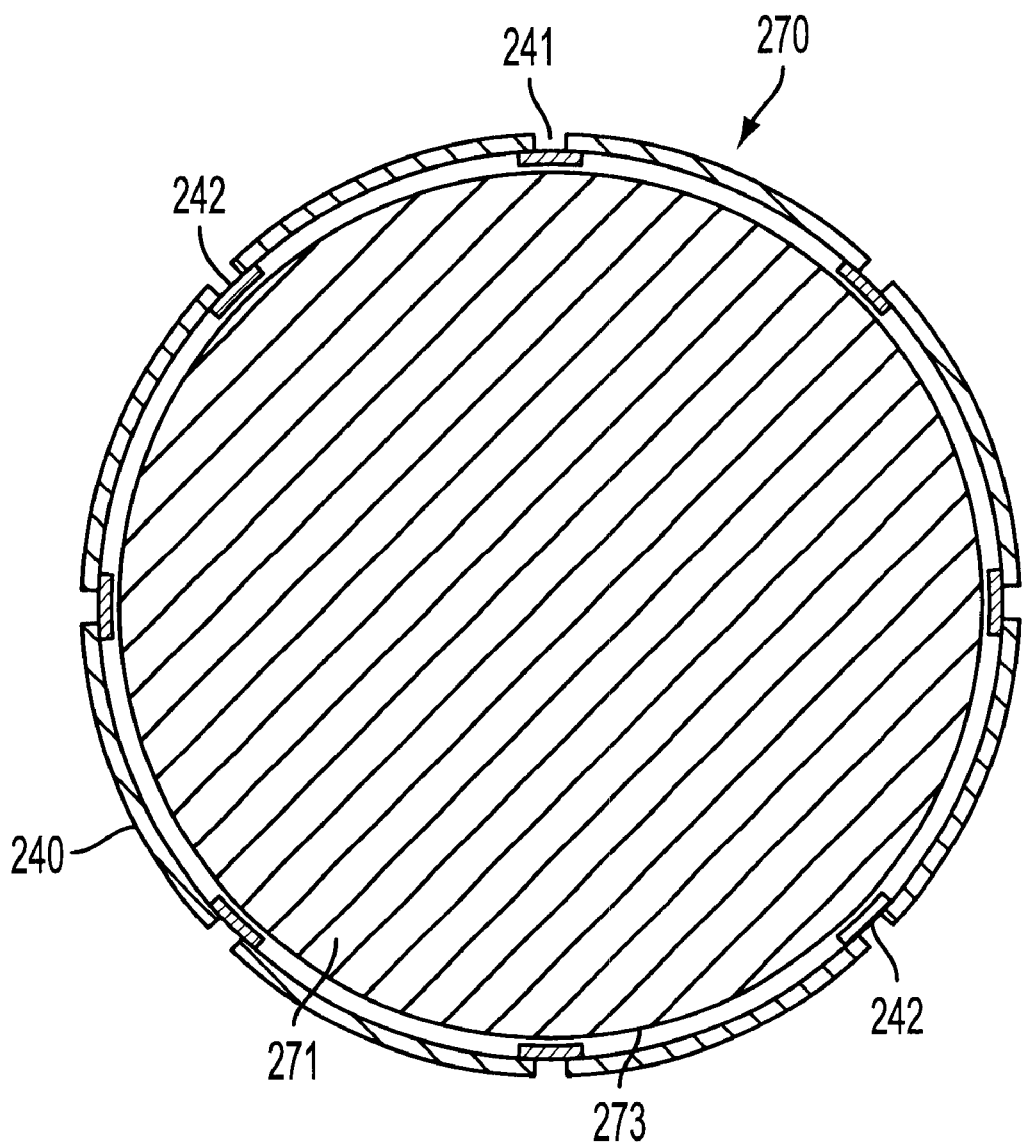
FIG. 3 is a sectional view taken along the line 3—3 of FIG. 1.

A description will be given of the gas generating apparatus 200 embodying the present invention, with specific reference to FIGS. 1 to 3. FIG. 1 is a longitudinal sectional view of the gas generating apparatus, FIG. 2 is a sectional view taken along the line 2—2 of FIG. 1, and FIG. 3 is a sectional view taken along the line 3—3 of FIG. 1.

Referring to FIG. 1, the gas generating apparatus 200 of this embodiment is a multi-stage inflator which has two initiators 261, 281 and two combustion chambers 250, 260.

The gas generating apparatus 200 has an outer shell which defines combustion chambers 250, 260 and which is composed of a base 210 in the form of an upwardly-opening vessel and a cup 220 in the form of a downwardly-opening vessel. A filter cap 240 is fixed to the upper side of the cup 220, whereby a filter chamber 270 accommodating a filter 271 is formed therebetween.

A pair of holes 212 and 213 are formed in the bottom of the base 210. A pipe 230 is received in the hole 212. A space around the pipe 230 provides a first combustion chamber 250, while the space inside the pipe 230 serves as a second combustion chamber 260. The first combustion chamber 250 contains a propellant 251. Similarly, the second combustion chamber 260 contains a propellant 265.

To ignite the propellant 251 in the first combustion chamber 250, a booster 280 is received in the hole 213. The booster 280 contains: (a) a first initiator 281 which fits in the hole 213 through an adapter 282; (b) a first aluminum cap 283 which surrounds the first initiator 281 and which is breakable at a pressure not lower than a predetermined pressure; (c) a booster propellant 284 charged in the space inside the first aluminum cap 283; and (d) an auto-ignition propellant 285 secured to the inner surface of the top wall of the first aluminum cap 283.

The auto-ignition propellant 285 is charged in the space inside the first aluminum cap 283 together with the booster propellant 284. The auto-ignition propellant 285 is automatically ignited when its temperature reaches about 150° C.; the ignition of the auto-ignition propellant 285 cause the booster propellant 284 to burn. The inner peripheral surface of the hole 213 and the outer peripheral surface of the adapter 282 are welded together.

The propellant 251 is charged inside the aluminum layer 252, which is disposed in and along the inner periphery of the cup 220 and which is supported at its bottom by a retainer plate 253.

In order to ignite the propellant 265 in the pipe 230, a second initiator 261 is received in the pipe 230 through the intermediary of the adapter 262. A sealing "O" ring 263 is placed between the adapter 262 and the pipe 230. First and second orifices (i.e., openings) 221 and 222 are provided in the top of the cup 220. The orifices 221, 222 introduce the combustion gases in the first and second combustion chambers 250 and 260 into the filter chamber 270. The first orifices 221 are closed by first foils 211 which face the first combustion chamber 250. The second orifices 222 are closed by second foils 223 which face the second combustion chamber 260 and also by fourth foils 224 which faces the filter chamber 270. Third orifices 241 are formed in the peripheral surface of the filter cap 240 and are closed by third foils 242 which face the filter chamber 270.

A further detailed description will be given of this gas generating apparatus. The base 210 has a pan-like form having a large hole 212 and a small hole 213 formed in the bottom wall thereof. The cup 220 is welded to this base 210 at portions which are indicated by black solid regions in the drawings. The pipe 230 is received in the large hole 212 until it abuts against the top surface of the cup 220 and is secured thereto by welding.

As has been described already, the smaller hole 213 formed in the base 210 accommodates the booster 280 which is disposed in the first combustion chamber 250 and which boosts the combustion in the first combustion chamber 250. The pipe 230 received in the larger hole 212 accommodates the second initiator 261 which is an ignitor which ignites at a predetermined time, e.g., 20 ms, after the ignition of the first initiator 281. The adapter 262 has a disk-shaped outer periphery and an outside diameter substantially equal to the inside diameter of the pipe 230. The adapter 262 holds the second initiator 261 at a predetermined position. The rubber "O" ring 263 is received in a groove formed in the outer peripheral surface of the adapter 262 thereby achieving a hermetic engagement between the adapter 262 and the pipe 230. A cylindrical supporting member 264, which has an outside diameter substantially equal to the inside diameter of the pipe 230, is provided at its one end with a flange that supports the adapter 262 at a predetermined height in the pipe 230. The pipe 230 also accommodates a highly combustible propellant 265 and the auto-ignition propellant 266 (which is automatically ignited at about 150° C. thereby causing the propellant 265 to burn).

The aforementioned propellant 251 is charged in the space between the booster 280 and the pipe 230. The propellant 251 is pressed and supported by the retainer plate 253 so as not to freely move in the first combustion chamber 250. The aluminum layer 252 disposed in the first combustion chamber 250 is opened at its top, with its open brim held in contact with the top wall of the cup 220.

As will be seen from FIG. 1, the filter 271 received in the filter chamber 270 is sized and shaped to almost fully occupy the space inside the filter cap 240. In this embodiment, the filter 271 has a thick-walled disk-like form. The lower face of the filter 271 is recessed substantially at the center thereof so as to provide a gap space 272 which affords a gap around the second orifices 222 and the first orifices 221. The filter 271 has an outside diameter smaller than that of the filter cap 240, so that a gap space 273 is formed between the inner surface of the filter cap 240 and the outer periphery of the filter 271. The gap space 273 faces the third orifices 241.

The different gap space 272 which, abuts the filter 271, is shaped so as to ensure that the inflating gases exiting the first orifices 221 and the second orifices 222 are guided in lateral directions perpendicular to the direction which the gases follow when exiting the first and second orifices 221, 222 (so that the gases spread over and penetrate through as wide an area of the filter 271 as possible).

The gap space 273 is intended to introduce the gases that have permeated through the filter 271 into the third orifices 241, 50 that the gases can be smoothly emitted through the third orifices 241. The gases from the filter 271 flow in random directions. Portions of the gases that have emanated from the filter 271 at locations remote from the third orifices 241 collide with the wall of the filter cup 240 and are, thereby, decelerated. In addition, these portions of the gases lose all velocity due the resistance encountered during flowing through the filter 271. This tendency is notable particularly in the region which is spaced apart from the orifice 241. As a consequence, such portions of the gases tend to stagnate in the filter 271. In the illustrated embodiment, however, smooth flow of the gases towards the orifice 241 is ensured by virtue of the gap space 273 which serves to guide the gases to the orifices 241.

The filter 271 is bonded by an adhesive to the inner surface of the filter chamber 270, or pressed between the outer surface of the cup 220 and the opposing surface of the filter chamber 270, so as not to rattle in the filter chamber 270.

The first foils 211 facing the first combustion chamber 250 and closing the first orifices 221 are adapted to break at a predetermined pressure. The second foils 223 facing the second combustion chamber 260 and closing the second orifices 222 are adapted to break at a predetermined pressure. The first and second foils function as closure devices. The fourth foils 224, which face the filter chamber 270, serve to prevent the combustion gases discharged through the first orifices 221 from rushing into the second combustion chamber 260. Thus, the first combustion chamber 250 and the second combustion chamber 260 are hermetically separated from each other. The fourth foils function as reverse flow preventers.

The third foils 242 covering the third orifices 241 and facing the filter chamber 270 serve to prevent ambient moisture and foreign matter from coming into the inflator 200. Thus, the filter chamber 270 is hermetically separated from the ambient air.

A description will now be given of the operation of the gas generating apparatus 200 of this embodiment. In the event of a collision of a vehicle, an acceleration sensor which is not shown produces an electrical signal and delivers this signal to an Electric Computer Unit (hereinafter "ECU") which also is not shown. The ECU delivers an ignition signal to the first initiator 281 in the booster 280 of the gas generating apparatus 200, whereby the first initiator 281 is ignited to bum the booster propellant 284 in the booster 280. As a result, the inner pressure of the booster 280 is drastically increased thereby breaking the first aluminum cap 283. As a result, the combustion gas from the booster 280 rushes into the first combustion chamber 250 causing the propellant 251 therein to bum instantaneously. Consequently, the inner pressure of the first combustion chamber 250 is instantaneously elevated thereby causing the first foils 211 (which close the first orifices 221 formed in the cup 220 and which face the first combustion chamber 250) to break. The combustion gases rush into the filter chamber 270 through the first orifices 221 which are now open. The combustion gases introduced into the filter chamber 270 reach the gap space 272 around the outlet of the first orifices 221; at this point, the gases are spread in lateral directions perpendicular to the direction of flow of the gases emitted through the first orifices 221. Consequently, the combustion gases enter the filter 271 over a wide area thereof. The gases then permeate through the filter 271 and eventually reach the gap space 273 around which the third orifices 241 are provided. Since the gases are allowed to freely flow through the gap space 273 without encountering any resistance, the gases break the third foils 242 and smoothly flow out of the gas generating apparatus 200 through the third orifices 241 without stagnating around the filter 271.

Then, after lapse of a certain time (e.g., 20 ms) from the ignition on the first initiator 281, the ECU delivers an ignition signal to the second initiator 261. As a result, the second initiator 261 is ignited to burn the propellant 265 in the second combustion chamber 260. As a result, the inner pressure of the second combustion chamber 260 is instantaneously elevated thereby causing the second foils 223 (which cover the second orifices 222 and which face the second combustion chamber 260) to break. As a consequence, the fourth foils 224, which have been bonded to close the second orifices 222 and which face the filter chamber 270, are easily peeled off to open the second orifices 222. Consequently, the combustion gases are allowed to flow into the filter 271 over a wide area thereof, while spreading in lateral directions perpendicular to the direction of the gases passing through the second orifices 222. The gases then permeate through the filter 271 and flow into the gap space 273 around which the third orifices 241 are formed. Since the gases are allowed to freely flow through the gap space 273 without encountering any resistance, the gases smoothly flow out of the gas generating apparatus through the third orifices 241 without stagnating.

In the gas generating apparatus of the present invention having the described configuration, the first orifices 221 and the second orifices 222 are located at different positions, and the combustion gases from the second combustion chamber 260 are allowed to reach the filter chamber 271 while bypassing the first combustion chamber 250. Therefore, the path or route through the filter 271 for the combustion gases exiting the second orifices 222 (and eventually being discharged from the third orifices 241) is different from the path or route through the filter 271 for the combustion gases exiting the first orifices 221 (and also eventually being discharged from the third orifices 241).

Any tendency for the combustion gases to locally concentrate in a restricted region on the filter can causes problems similar to those experienced by the inflator disclosed in the U.S. Pat. No. 6,032,979. In the inflator disclosed in U.S. Pat. No. 6,032,979, the combustion gases from the second combustion chamber are discharged via the first combustion chamber; because the gases from the second combustion chamber can only reach the filter through the first combustion chamber, the combustion gases generated in and exiting the second combustion chamber pass through a region of the filter that has already been heated to a high temperature by the combustion gases that were generated in and exited from the first combustion chamber. Such a heated region of the filter cannot satisfactorily cool the gases coming from the second combustion chamber.

In contrast, in the present invention, the combustion gases from the second combustion chamber 260 permeate through a region of the filter 271 which has been penetrated by only a small amount of the gases from the first combustion chamber 250; accordingly, the region has not yet been heated. Consequently, the cooling capacity inherently possessed by the filter 271 can effectively be used to achieve a high cooling effect.

In the gas generating apparatus 200 as described, the cup 220 serves also as a partition between the filter chamber 270 and the combustion chambers 250, 260, so that the gas generating apparatus, i.e., the inflator, of the described embodiment can be easily manufactured at low costs due to the possibility of using the cup 220, rather than a separate and additional partition, to separate the combustion chambers 250, 260 from the filter chamber 270.

The gas generating apparatus 200 of the described embodiment can employ a filter cup 240 which is sized to cover almost the entire area of the cup 220. This affords an ample volume of the filter 271 incorporated in the filter cup 240, thereby offering a greater cooling capacity of the inflator.

A description will now be given of another embodiment of the inflator in accordance with the present invention, with specific reference to FIGS. 4 to 6.

Figure 4:
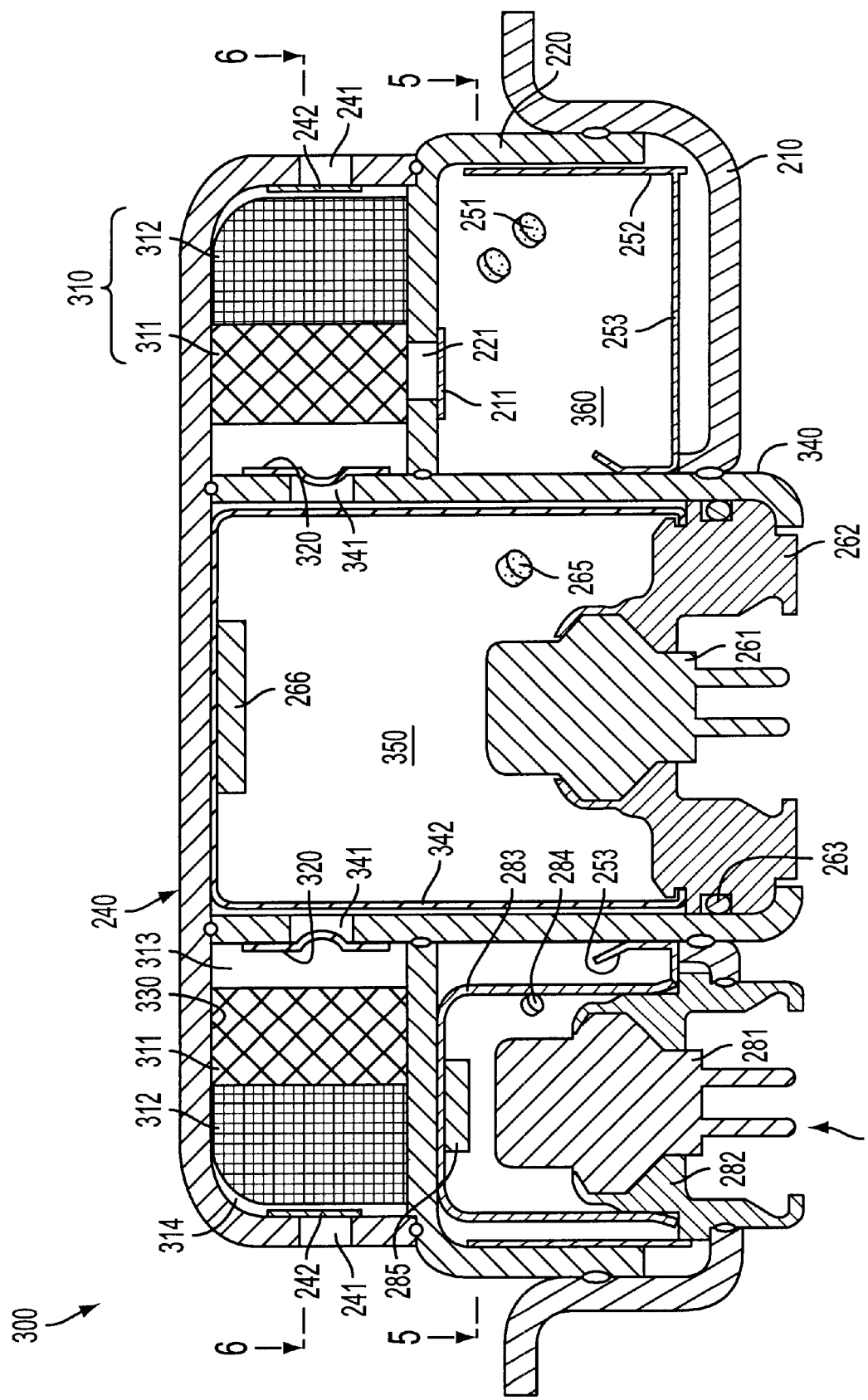
FIG. 4 is a sectional view of another embodiment of the gas generating apparatus of the present invention.
Figure 5:
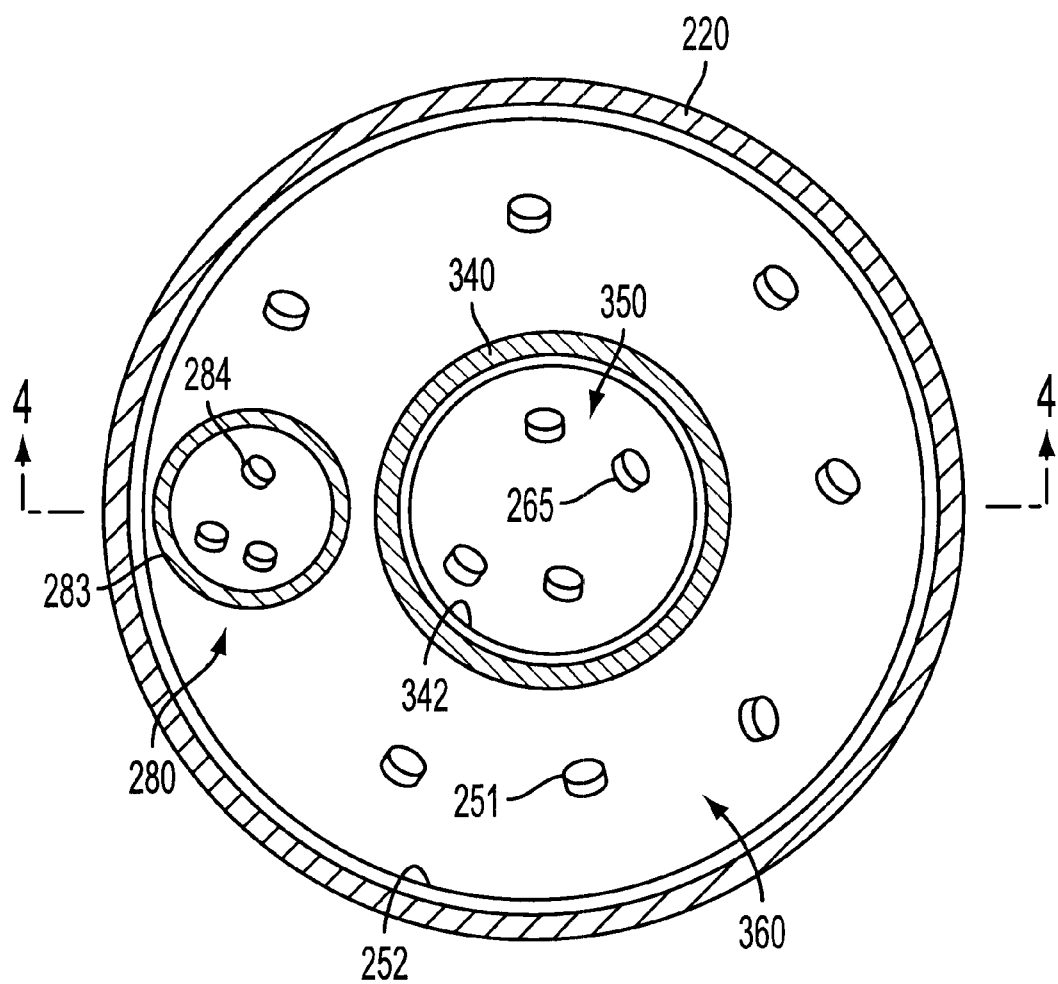
FIG. 5 is a sectional view taken along the line 5—5 of FIG. 4.
Figure 6:
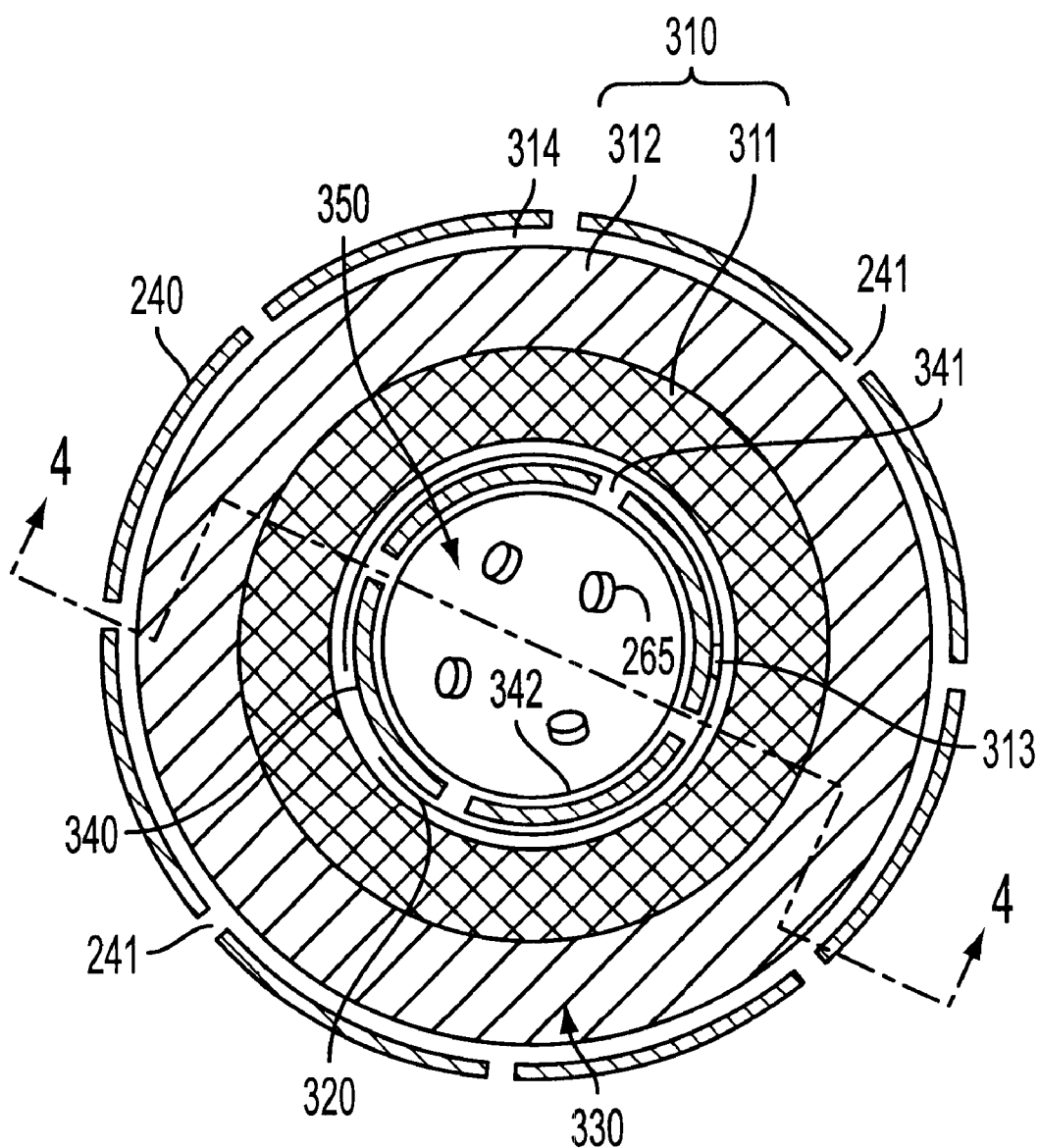
FIG. 6 is a sectional view taken along the line 6—6 of FIG. 4.

FIG. 4 is a longitudinal sectional view of a gas generating apparatus, and FIGS. 5 and 6 are sectional views taken along the lines 5—5 and 6—6 of FIG. 4, respectively. In addition, the lower half part of FIG. 4 shows a section taken along the line 4—4 of FIG. 5, while the upper half part of FIG. 4 shows a section taken along the line 4—4 of FIG. 6.

The gas generating apparatus of this embodiment, denoted by numeral 300, is a multi-staged inflator having two initiators and two combustion chambers, as is the case of the gas generating apparatus 200 of the preceding embodiment. In this inflator 300, the pipe 340 penetrates through the cup 220 and is welded at its upper end to the top wall of the filter cup 240. A filter 310 is arranged in an annular configuration surrounding the pipe 340. Second orifices 341 are formed in the peripheral wall of the portion of the pipe 340 projecting into the filter chamber 330. A stainless steel ring 320 is wound on the above-mentioned peripheral wall of the pipe 340 so as to cover and close the second orifices 341. A second combustion chamber 350, defined in the pipe 340, is hermetically separated from the filter chamber 330 and also from a first combustion chamber 360 which also is defined around the pipe 340.

The pipe 340 receives a second aluminum cap 342 which has a cylindrical form closed at its one end and which is breakable at a predetermined pressure. The second aluminum cap 342 corresponds in function to the second foils 223 of the first embodiment described before. The second aluminum cap 342 receives a propellant 265. The black solid regions show the weld regions also in FIG. 4.

In this embodiment, the annular filter 310 has two filter sections having different natures: namely, a first annular filter section 311 and a second annular filter section 312. The first annular filter section 311 provides a radially inner region of the filter 310 and employs comparatively large-diameter iron wires (e.g., 0.5 mm diameter) and can sustain the high temperature of the combustion gas. The second annular filter section 312, which is radially outward in comparison to the first annular filter section 311, employs comparatively small-diameter iron wires (e.g., 0.3 mm diameter) thereby presenting surface areas large enough to efficiently dissipate heat possessed by the combustion gases that have been cooled to some extent through the first filter section 311. The described combination of the first filter section 311 and the second filter section 312 are only illustrative and the gas generating apparatus 300 of this embodiment may employ a variety of combinations. For instance, the first filter section 311 made of iron wires may be combined with a second filter section 312 which is composed of wires of a metal having a greater thermal conductivity than iron, e.g., aluminum or copper.

In this embodiment, a gap space 313 is formed between the outer surface of the peripheral wall of the pipe 340 and the inner peripheral surface of the first filter section 311. Moreover, a gap space 314 is formed between the inner peripheral surface of the filter cup 240 and the second filter section 312.

Other portions of the gas generating apparatus 300 are the same as those of the gas generating apparatus 200 of the preceding embodiment, and are denoted by the same reference numerals as those employed in the description of the preceding embodiment.

The operation of the gas generating apparatus 300 is as follows. In the event of a collision of a vehicle, an acceleration sensor which is not shown produces an electrical signal and delivers this signal to an ECU (which also is not shown). The ECU delivers an ignition signal to the first initiator 281 in the booster 280 of the inflator 300, whereby the first initiator 281 is ignited to burn the booster propellant 284 in the booster 280. As a result, the inner pressure of the booster 280 is drastically increased thereby breaking the first aluminum cap 283 and causing the combustion gas from the booster 280 to enter the first combustion chamber 360 in which the propellant 251 is burnt instantaneously. Consequently, the inner pressure of the first combustion chamber 360 is instantaneously elevated thereby breaking the first foils 211 which close the first orifices 221 formed in the cup 220 and which face the first combustion chamber 360. As a result, the combustion gas rushes into the filter chamber 330 through the first orifices 221 (which are now open). The combustion gases introduced into the filter chamber 330 permeate through the first filter section 311 and then through the second filter section 312. After filling the gap space 314, the combustion gases break through the third foils 242 and are smoothly discharged to the exterior through the third orifices 241.

Then, after lapse of a certain time (e.g., 20 ms) from the ignition of the first initiator 281, the ECU delivers an ignition signal to the second initiator 261. As a result, the second initiator 261 is ignited and burns the propellant 265 in the second combustion chamber 350. As a result, the inner pressure of the second combustion chamber 350 is instantaneously elevated causing the second aluminum cap 342 to break. Then, the stainless steel ring 320, which covers the second orifices 341 and which faces the filter chamber 330, is broken by the gas pressure thereby opening the second orifices 341. As a result, the combustion gases rush into the first filter section 311, via the gap space 313, and reach the gap space 314 after permeating through the second filter section 312. From the gap space 314, the gases may finally be smoothly discharged to the exterior through the third orifices 241.

In the gas generating apparatus 300 of the described embodiment, the first orifices 221 and the second orifices 341 are located at positions which are spaced apart from each other, so that the combustion gases from the second combustion chamber are caused to flow through a region of the filter which has not yet been heated by the combustion gases generated in and discharged from the first combustion chamber. Consequently, the cooling capacity inherently possessed by the filter 310 can effectively be used to achieve a high cooling effect.

In the gas generating apparatus 300 as described, the cup 220 serves also as a partition between the filter chamber 330 and the first combustion chamber 360. The gas generating apparatus 300 (i.e., the inflator) can be easily manufactured at low costs by using the cup 220 of the known inflator without requiring a separate partition wall.

Further, the gas generating apparatus 300 of this embodiment can employ a second combustion chamber 350 having an ample volume which can accommodate a large amount of propellant 265.

Although each of the described embodiments employ a couple of combustion chambers, such a configuration is only illustrative and the gas generating apparatus may employ three or more combustion chambers.

As will be understood from the foregoing description, the gas generating apparatus in accordance with the present invention has at least two combustion chambers each having orifices. The orifices of each of the combustion chambers are separately held in communication with a filter chamber so that gases only need to go through the orifices of one combustion chamber to reach the filter chamber. To prevent combustion gases generated in a first of the combustion chambers from flowing into a second combustion chamber, a reverse-flow prevention member is provided in the orifice of the second combustion chamber. Consequently, combustion gases from different combustion chambers flow through different regions of the filter. Accordingly, the combustion gases from one combustion chamber (in which combustion takes place with a certain time lag behind the earlier combustion in another combustion chamber) pass through a region of the filter which has not yet been heated by the combustion gases generated by the earlier combustion chamber. As a result, the combustion gases generated by the later combustion chamber are effectively cooled by a different region of the filter. In accordance with the present invention, it is thus possible to obtain a gas generating apparatus having high cooling effect.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims and equivalents thereof.

What is claimed is:

1. A gas generating apparatus, comprising:
   a vessel having a top wall and a side wall and containing a first combustion chamber having a first opening; and a second combustion chamber having a second opening;
   wherein each of the combustion chambers contains an ignitor and a propellant;
   wherein at least one of the combustion chambers contains a cap containing a booster propellant and an auto ignition propellant;
   a filter chamber accommodating a filter, wherein said filter chamber overlies the top wall of the vessel and is separated from each of said combustion chambers;
   wherein the vessel includes a metal lining covering an interior surface of the side wall of the vessel and wherein an interior surface of the top wall of the vessel is not covered by the metal lining, wherein the metal lining is supported by a retainer plate;
   wherein the apparatus is configured so that a combustion gas produced in the first combustion chamber exits the first combustion chamber through the first opening and enters a first portion of the filter chamber without passing through the second chamber; and
   a reverse-flow prevention member provided over the second opening thereby preventing the combustion gas generated in the first combustion chamber from flowing into the second combustion chamber.

2. The gas generating apparatus of claim 1, wherein the apparatus is configured so that a combustion gas produced in the second combustion chamber exits the second combustion chamber through the second opening and enters a second portion of the filter chamber without passing through the first combustion chamber.

3. The gas generating apparatus of claim 2, further comprising a third opening located in the filter chamber to allow the combustion gas produced in the combustion chambers to enter an expanding bag.

4. The gas generating apparatus of claim 2, wherein the first and second openings are spaced apart so that the combustion gases exiting from the first and second combustion chambers do not pass through the filter in a locally concentrated manner.

5. The gas generating apparatus of claim 1, wherein the first opening faces the first portion of the filter chamber and the second opening faces a second portion of the filter chamber spaced apart from the first portion.

6. The gas generating apparatus of claim 1, wherein the top wall is positioned to separate the first and second combustion chambers from the filter chamber.

7. The gas generating apparatus of claim 6, wherein the top wall contains the first and second openings.

8. The gas generating apparatus of claim 7, further comprising:
a first closure device blocking the first opening and being configured to open when the pressure in the first combustion chamber reaches a first predetermined value; and
a second closure device blocking the second opening being configured to open when the pressure in the second combustion chamber reaches a second predetermined value.

9. The gas generating apparatus of claim 8, wherein the first closure device is configured to hermetically seal the first chamber.

10. The gas generating apparatus of claim 8, wherein the second closure device is configured to hermetically seal the second chamber.

11. The gas generating apparatus of claim 8, wherein each closure device includes a breakable member adapted to break when pressure in the adjacent chamber reaches the predetermined value.

12. The gas generating apparatus of claim 1, wherein the metal lining comprises aluminum.

13. The gas generating apparatus of claim 1, wherein the ignitor in at least one of the combustion chambers is supported by a cylindrical supporting member.

14. The gas generating apparatus of claim 1, wherein the cap abuts the top wall of the vessel.

15. A gas generating apparatus, comprising:
an inverted cup shaped vessel having a top wall and a side wall, the vessel containing a first combustion chamber including a first opening; and a second combustion chamber including a second opening;
wherein at least one of the combustion chambers contains a cap containing a booster propellant and an auto ignition propellant;
a filter chamber accommodating a filter, wherein said filter chamber is separated from each of said combustion chambers and overlies the top wall of the vessel;
wherein an interior surface of the side wall of the vessel is covered by a metal lining having an opening adjacent the top wall of the vessel, wherein the metal lining is supported by a retainer plate;
wherein the apparatus is configured so that a first combustion gas produced in the first combustion chamber exits the first combustion chamber through the first opening and enters a first portion of the filter chamber without passing through the second chamber and a second combustion gas produced in the second combustion chamber exits the second combustion chamber through the second opening and enters a second portion of the filter chamber without passing through the first combustion chamber; and
wherein the first and second openings are spaced apart so that the combustion gases exiting from the first and second combustion chambers do not pass through the filter in a locally concentrated manner.

16. The gas generating apparatus of claim 15 further comprising an ignitor and a propellant positioned in each of said first and second combustion chambers.

17. The gas generating apparatus of claim 15 further comprising a reverse flow preventer positioned over the second opening.

18. The gas generating apparatus of claim 15 further comprising: a first closure device blocking the first opening and being configured to open when the pressure in the first combustion chamber reaches a first predetermined value; and a second closure device blocking the second opening being configured to open when the pressure in the second combustion chamber reaches a second predetermined value.

19. The gas generating apparatus of claim 18 wherein the second opening includes a reverse flow preventer to prevent the first combustion gas from entering the second combustion chamber.

20. The gas generating apparatus of claim 15, wherein the metal lining comprises aluminum.

* * * * *